United States Patent [19]

Kawamura et al.

[11] Patent Number: 4,716,428
[45] Date of Patent: Dec. 29, 1987

[54] AUTOMATIC FILM LOADING DEVICE FOR CAMERA

[75] Inventors: Masaharu Kawamura, Kawasaki; Yoshihito Harada, Yokohama; Ryuichi Kobayashi, Kawasaki; Masayuki Suzuki, Yokohama; Tsunemasa Ohara; Yoichi Tosaka, both of Tokyo, all of Japan

[73] Assignee: Canon Kabushiki Kaisha, Tokyo, Japan

[21] Appl. No.: 942,387

[22] Filed: Dec. 16, 1986

[51] Int. Cl.⁴ .................................................. G03B 1/12
[52] U.S. Cl. .................................. 354/173.11; 354/213
[58] Field of Search .................. 354/173.1, 173.11, 213

[56] References Cited
U.S. PATENT DOCUMENTS 4,400,074 8/1983 Akiyama et al. ............... 354/206 X 4,572,637 2/1986 Inoue ........................ 354/173.11

Primary Examiner—Michael L. Gellner
Attorney, Agent, or Firm—Robin, Blecker & Daley

[57] ABSTRACT

An automatic film loading device for a camera arranged to automatically feed the camera with a film to an extent of obtaining a first photographable frame portion of the film after film loading comprises first switch means arranged to open and close for every frame portion of the film; second switch means arranged to open and close a plurality of times during frame feeding; and control means arranged to count the number of times for which the position of the second switch means changes before the position of the first switch means changes after film loading and to control the number of blank frame portions to be fed up to the first of the photographable frame portions according to a counted value thus obtained.

6 Claims, 12 Drawing Figures

AUTOMATIC FILM LOADING DEVICE FOR CAMERA

BACKGROUND OF THE INVENTION

1. Field of the Invention

This invention relates to an automatic film loading device for a camera which is arranged to feed a portion of film in a blank state onto a spool when the camera is loaded with the film.

2. Description of the Related Art

The automatic film loading function of the conventional automatic camera has been arranged to actuate a driving device of a film winding transmission system either in response to closing of a back lid of the camera when the camera is loaded with the film or in response to a first operation on a shutter release button and to continuously feed a given number of frame portions of film (three frame portions, for example) in a blank state to ensure that a non-exposed area of film is pulled out to an aperture position with the leader part of the film reliably taken up on a spool. To index the given number of frame portions, a one-frame detecting device which is generally used for one-frame winding is used. For example, the cam of a rotating wheel which rotates in association with a sprocket and a cam follower are arranged to be in such a relation that causes a switch piece to turn on every time one frame portion of film is fed. The conventional arrangement includes a driving motor which is arranged to be brought to a stop when a fourth pulse is generated by the one-frame detecting device indicating that four frame portions of film has been fed. The arrangement of this kind has been known, for example, from the disclosure made in U.S. Pat. No. 4,400,074.

However, the above-stated arrangement has presented the following problem: After winding up all the frame portions of film, when all the frame portions are rewound by the driving force of a motor, the rotating wheel of the one-frame detecting device is also caused to rotate. This randomly brings the rotating wheel of the one-frame detecting device into any unpredictable phasic position when the motor comes to a stop after completion of the film rewinding. Therefore, in the next automatic loading operation on the camera with a new film, the initial phase of the rotating wheel most probably differs from the previous initial phase to result in a different blank feeding extent of film.

Referring to FIG. 11 of the accompanying drawings, a detection member is arranged to produce pulses to define frame intervals. However, the above-stated unstable initial phase of the rotating wheel makes a given length A of the leader part of film to be fed before a first frame defining pulse is produced from the detection member either longer or shorter. As a result, there arises a great difference in the blank feeding length of film with the four frame portions of film blank fed as mentioned above. Then, this difference might cause the first frame portion of film to be accidentally exposed to light during film loading or the film might fail to permit, say, 24 photo-taking exposures despite of that the length of the film product is arranged for 24 exposure.

In view of the above-stated problem, the present applicant has proposed a solution of the problem as disclosed in U.S. patent application Ser. No. 576,857, filed Feb. 3, 1984. In accordance with the proposed solution, one and the same motor is used for shutter charging, film winding and film rewinding. The motor is arranged to engage a shutter charging transmission system and a film winding transmission system for film winding. In rewinding the film, the position of a clutch which is arranged to be responsive to a rewinding button is shifted to bring the motor into engagement with the film rewinding transmission system. This proposed solution is characterized in that: The clutch is automatically shifted back to a film winding position upon detection of completion of film rewinding by rewinding completion detecting means. Then, a winding and charging action is performed to an extent corresponding to one frame, i.e. until the phase of the rotating wheel of the one-frame detecting device comes to a point corresponding to the end of one frame. This arrangement ensures accurate blank film feeding to an extent exactly corresponding to the predetermined number of frames (four, for example) in automatically loading the camera with a new film. The proposed arrangement, however, has the following shortcomings: First, it necessitates a forced winding action upon completion of film rewinding. Secondly, the expected advantageous effect is not attainable if the rotating wheel of the above-stated one-frame detecting device is of a type operating solely in response to the movement of the film.

SUMMARY OF THE INVENTION

It is an object of this invention to provide an automatic film loading device for a camera which is capable of accurately carrying out automatic loading by blank feeding the camera with film exactly up to the first of photographable frame portions of film.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
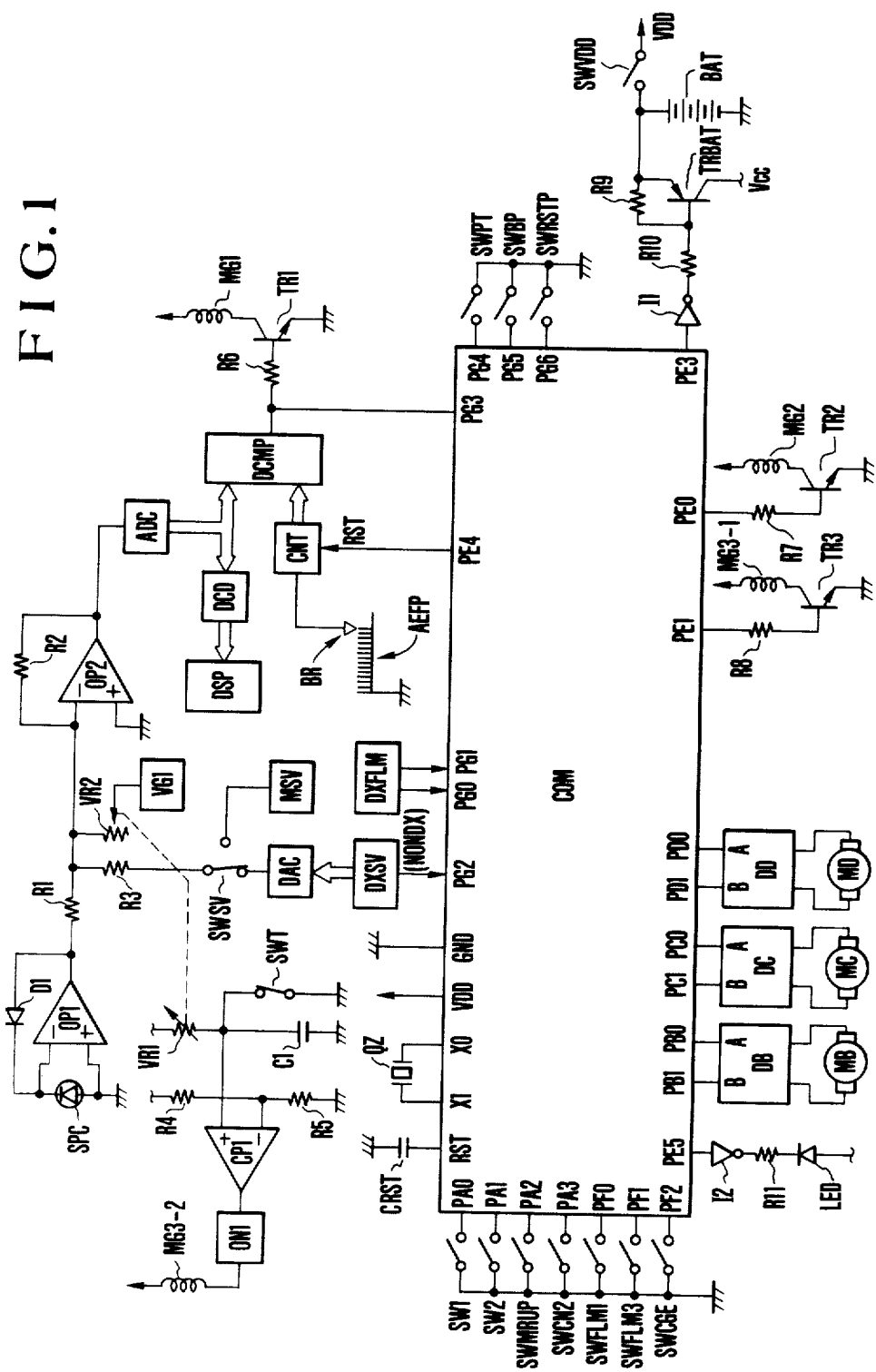
FIG. 1 is a circuit diagram showing a microcomputer and peripheral circuit elements of a camera to which this invention is advantageously applicable.

Hereinafter, the present invention will be described in detail based on the embodiment thereof shown in the drawings.

FIG. 1 is a circuit diagram of a camera arranged as an embodiment of this invention. The details of the embodiment is as follows: A light receiving (photosensitive) element SPC are arranged to receive a light flux coming from an object to be photographed. A light measuring circuit which includes an operational amplifier OP1 and a compressing diode D1 is arranged to obtain logarithmically compressed information BV corresponding to the luminance of the object. Meanwhile, film sensitivity information SV is obtained either from ISO film sensitivity value detecting means DXSV or from manual film sensitivity value setting means MSV. Shutter time setting information TV is obtained from a variable resistor VR2 which is arranged to operate in response to a shutter dial. An operational amplifier OP2 is arranged to obtain an aperture value AV in the form of a voltage by computation performed on the information or data BV, SV and TV. A display device DSP is arranged within a view finder to display this aperture value AV. Then, a diaphragm control magnet MG1 controls the aperture of a diaphragm according to the value AV. The illustration of FIG. 1 includes a DA (digital-to-analog) converter DAC which is arranged to DA convert the data from the ISO film sensitivity detecting means; a selection switch SWSV is arranged to make selection between the manual film sensitivity value setting means MSV and the ISO film sensitivity value detecting means DXSV; a constant voltage source VG1; the operational amplifier OP2 which is arranged to compute an aperture value in a manner BV+SV−TV from the data BV, SV and TV as mentioned above; an AD (analog-to-digital) converter ADC; a decoder driver DCD which is provided for the display device; a counter CNT; a comb-shaped electrode AEFP; and a brush BR for the electrode AEFP. The instant the aperture of the lens is stopped down, the brush travels to produce a signal. This signal is supplied to the counter CNT. The counter CNT thus counts the signal to give a counted value as an actually stopped down aperture value. A digital comparator DCMP is arranged to have the output of the counter CNT supplied to one of the input terminals thereof. Meanwhile, the above-stated computed aperture data which is converted into a digital value is supplied from the AD converter ADC to the other input terminal of the digital comparator DCMP. When the two inputs come to coincide with each other, the output level of the comparator DCMP becomes a low level (hereinafter referred to as a level 0). The low level signal comes via a resistor R6 to turn off a transistor TR1. With the transistor TR1 turned off, a current flowing to the aperture control magnet MG1 is cut off to bring the stopping down operation on a diaphragm to a stop. The lens aperture is thus actually controlled in accordance with the computed aperture value.

A first clamp magnet MG2 is arranged to initiate a known mechanical sequence of processes of the camera when the magnet is driven. With the magnet MG2 driven, the above-stated aperture control is first accomplished. A magnet MG3-1 is arranged to release or unlock a leading shutter curtain from a locked state. With a current supplied to the magnet MG3-1, the leading shutter curtain is allowed to travel. A count switch SWT is arranged to be normally closed and to open when the leading shutter curtain travels. A variable resistor VR1 and a capacitor C1 jointly form an integration circuit which becomes operative when the count switch SWT opens. The variable resistor VR1 is mechanically coupled with the above-stated variable resistor VR2 and is thus arranged to be set at a resistance value corresponding to a preset shutter time value. A comparator CP1 has the integrated voltage output of the integration circuit supplied to one of the input terminals thereof. Meanwhile, a voltage Vcc obtained by dividing a power supply voltage with resistors R4 and R5 is arranged to be supplied to the other input terminal of the comparator CP1. Accordingly, the output of the comparator CP1 is under the control of a time constant circuit having the time constant thereof determined by the variable resistor VR1. The output level of the comparator CP1 becomes a high level (hereinafter referred to as a level 1) after the lapse of the shutter time. Then a one-shot circuit ON1 causes the output of the comparator CP1 to be at a level 0 for a predetermined period of time. By this, a current is supplied to a magnet MG3-2 which is provided for a trailing shutter curtain. The magnet MG3-2 then allowed the trailing shutter curtain to travel.

The camera is provided with a total of three motors including one for film winding, another for film rewinding and the last one for a charging action. A reference symbol MB denotes the film winding motor; a symbol DB a driving circuit for the motor MB; a symbol MC the film rewinding motor; a symbol DC a driving circuit for the motor MC; a symbol MD the charge motor; and a symbol DD a driving circuit for the motor MD.

A film frame number reading device DXFLM is arranged to read a frame number code of the film which is provided in a DX code. A warning display device LED is arranged to give a warning in the event of a film having no DX code.

A microcomputer COM is arranged to control the operation of the camera described. The microcomputer COM is provided with a power supply battery BAT and a power supply transistor TRBAT. The static circuit operation described in the foregoing is performed only while the power supply transistor TRBAT is on. The microcomputer COM receives the power supply when a power supply switch $SWV_{DD}$ is turned on.

The microcomputer COM includes terminals X0 and X1 which are connected to a crystal oscillator QZ arranged to supply fundamental clock pulses; a reset terminal RST; a power supply terminal $V_{DD}$; and a ground terminal GND. The input ports of the microcomputer COM include an input port PA0 which is connected to a first stroke switch SW1 arranged to be turned on by the first stroke of operation on a shutter release button; an input port PA1 which is connected to a second stroke switch SW2 arranged to be turned on by the second stroke of operation on the shutter release button; an input port PA2 which is connected to a mirror switch SWMRUP arranged to be in an ON state while a mirror is in a down position thereof; an input port PA3 connected to a trailing shutter curtain switch SWCN2 which is arranged to turn off when the trailing shutter curtain travels and to turn on when the trailing shutter curtain is charged; an input port PF0 connected to a first film switch SWFLM1 which is arranged to turn on and off according as a sprocket turns round; an input port PF1 connected to a third film switch SWFLM3 which is arranged to turn on in response to the sprocket upon completion of winding one frame portion of film as will be described later; an input port PF2 connected to a charge switch SWCGE which is arranged to turn on upon completion of a charging action on the shutter, an automatic aperture control device and a mirror; input ports PG0 and PG1 connected to the above-stated frame number reading device DXFLM; an input port PG2 connected to an ISO film sensitivity value detector DXSV; and an input port PG3 connected to the above-stated digital comparator DCMP. The microcomputer COM is provided further with an input port PG4 connected to a film cartridge presence/absence switch SWPT; a port PG5 connected to a camera back lid opening/closing switch SWBP which is arranged to be in an OFF state when the back lid of the camera is closed; and a port PG6 connected to a leader part selection switch SWRSTP which is arranged to permit selection between complete rewinding of film into the film cartridge and film rewinding leaving a leader part of the film outside of the cartridge and to turn on when the former rewinding is selected and off when the latter is selected. This switch SWRSTP is either arranged outside of the camera to permit the photographer to freely make the selection or arranged with a wiring pad disposed within the camera or on a printed circuit board to permit a service station or the like to make the selection according to the desire of the photographer.

The output ports of the microcomputer COM include an output port PE0 connected to a first clamp magnet MG2 via a resistor R7 and a transistor TR2; an output port PE1 connected to the leading shutter curtain magnet MG3-1 via a resistor R8 and a transistor TR3; an output port PE3 connected to the power supply transistor TRBAT via an inverter I1 and a resistor R10; an output port PE4 connected to the reset input terminal RST of a counter CNT; and an output port PE5 connected to the DX code warning display device LED via an inverter I2 and a resistor R11. Further, output ports PB0, PB1, PC0, PC1, PD0 and PD1 are connected respectively to driving circuits DB, DC and DD which are provided for motors MB, MC and MD.

Figure 2:
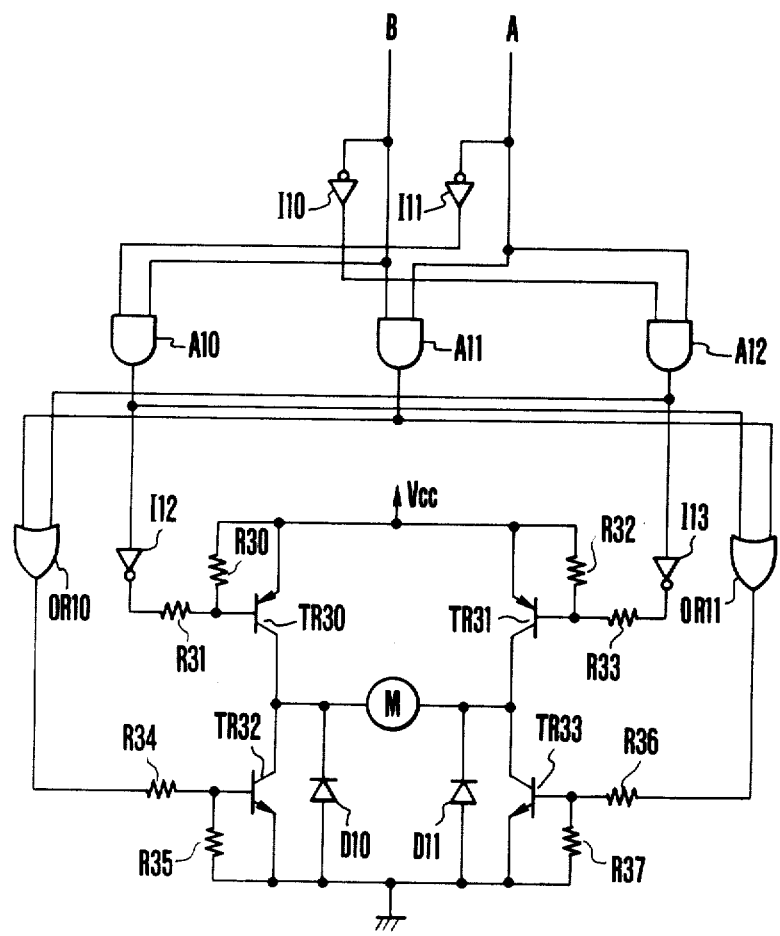
FIG. 2 is a circuit diagram showing a motor driving circuit.

The driving circuits DB, DC and DD for the motors MB, MC and MD are arranged in the same manner. FIG. 2 shows the details of each of these driving circuits. The illustration includes a motor M; inputs A and B; inverters I10 and I11; AND gates A10, A11 and A12; OR gates OR10 and OR11; transistors TR30, TR31, TR32 and TR33; resistors R30, R31, R32, R33, R34, R35 and R36; and diodes D10 and D11. The inputs A and B are information or data consisting of two bits. In case of A=1 and B=0, the output of the AND gate A12 becomes a level 1 and that of the OR gate OR10 also becomes a level 1. Then, the transistor TR32 turns on. Further, the output of the inverter I13 becomes a level 0 to cause the transistor TR31 to turn on. This in turn causes a current to flow to the motor M from the power supply Vcc through the transistor TR31, the motor M and the transistor TR32. The motor then rotates. If A=0 and B=1, the output of the AND gate A10 becomes a level 1; that of the OR gate OR11 also becomes a level 1; and that of the inverter I12 becomes a level 0. This causes the transistors TR30 and TR33 to turn on. As a result, the motor M comes to rotate in the direction reverse to the direction in which it rotates in the above-stated case. In the event of A=1 and B=1, the output of the AND gate A11 becomes a level 1. The outputs of the OR gates OR10 and OR11 then become a level 1. The transistors TR32 and TR33 turn on. Therefore, when the driving circuit is set into this input mode while the motor M is rotating, the power supply from the power supply Vcc is cut off irrespective of the rotation of the motor caused by the diodes D10 and D11 and the transistors TR32 and TR33 in whichever direction the motor may be rotating. Then, while the motor further rotates by the force of inertia, a short-circuit brake is applied to the motor.

Further, in the event of A=0 and B=0, the outputs of all the AND gates A10 to A12 become a level 0. All the transistors TR30, TR31, TR32 and TR33 turn off to bring the motor into an open state.

Figure 3:
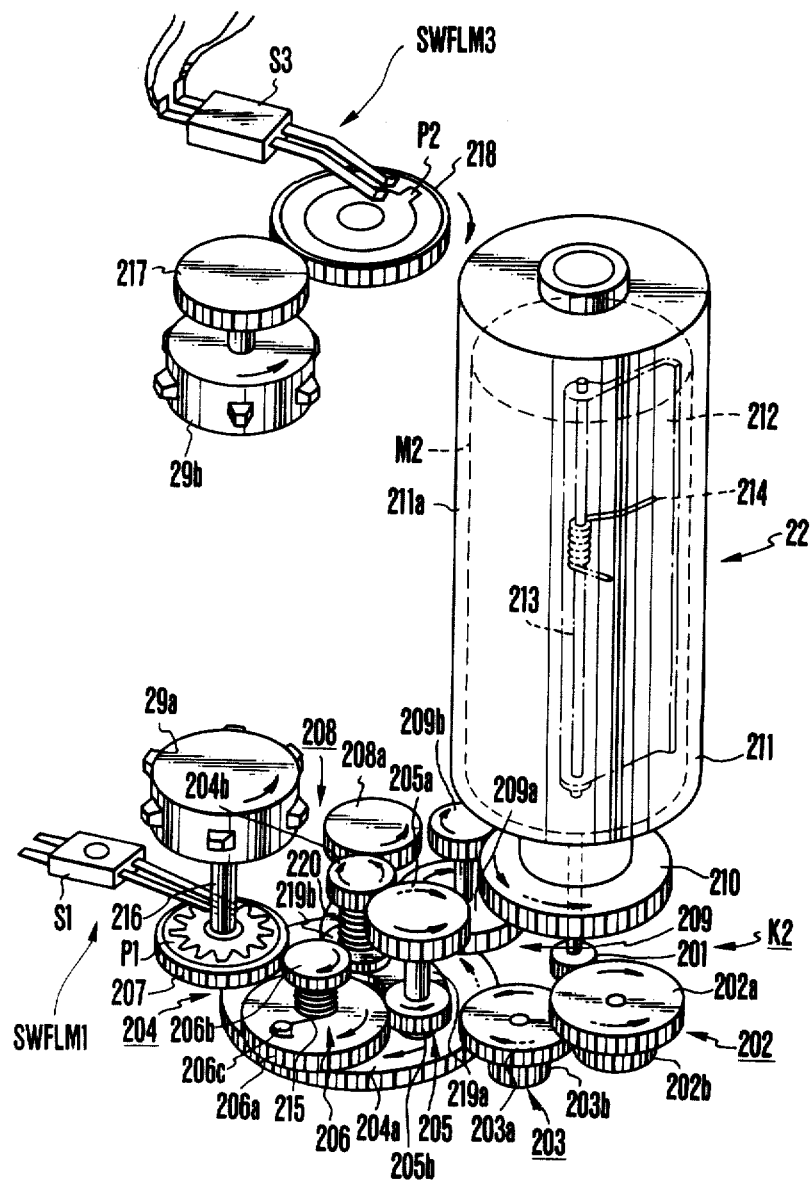
FIG. 3 is an oblique view showing a film winding transmission system.

FIG. 3 shows the details of the film winding motor MB and a film winding transmission system. A pinion gear 201 is secured to the output shaft of the winding motor MB which is disposed within a spool arrangement 22. A double gear 202 consists of a large gear 202a and a small gear 202b and is pivotally carried. The large gear 202a engages the pinion 201. Another double gear 203 consists of a large gear 203a and a small gear 203b and is also pivotally held in a rotatable state. The large gear 203a engages the small gear 202b. A double gear 204 consists of a large gear 204a and a small gear 204b and is pivotally held in a rotatable state. The large gear 204a engages the small gear 203b. A planetary lever 219a is pivotally connected to the center shaft of the double gear 204 by means of a bearing 219b. A compression spring 220 is interposed in between the small gear 204b and the bearing 219b and is arranged to bring the bearing 219b and the large gear 204a into frictional contact with each other. This frictional contact causes the planetary lever 219a to turn round following the rotation of the gear 204. On the planetary gear lever 219a are rotatably arranged a double gear 205 consisting of a large gear 205a and a small gear 205b and another double gear 208 consisting of a large gear 208a and a small gear (which is not shown but is secured to the lower part of the large gear 208a). A double gear 206 is arranged in the neighborhood of the gear 205. The gear 206 consists of large and small gears 206a and 206b which are pivotally carried independently of each other. However, a coiled spring 215 is arranged in between the large and small gears 206a and 206b to perform a one-way clutch function there. One end of the spring 215 is secured to a boss 206c of the large gear 206a. The coiled spring 215 tightens the shaft part of the small gear 206b according as the large gear 206a turns round clockwise and thus causes the small gear 206b to come to rotate together with the large gear 206a. A gear 207 is arranged to be constantly engaging the small gear 206b and to cause a driving sprocket 29a to rotate by means of a shaft 216. To the gear 207 is secured a pulse substrate P1 which has the whole circumference thereof equally divided into 12 parts. While the driving sprocket 29a makes one turn, 12 pulses are obtained through a contact member S1. The pulse substrate P1 and the contact member S1 jointly form a switch SWFLM1. Therefore, the driving sprocket 29a has six teeth. In the case of a full-size 35 mm camera, the sprocket 29a feeds one frame portion of film while it makes 4/3 turn. Therefore, the number of pulses obtained via the contact member S1 is 16. It goes without saying that the number of equal divisions of the pulse substrate P1 is selectable as desired.

A double gear 209 consisting of a large gear 209a and a small gear 209b is disposed in the neighborhood of the gear 208 and is pivotally held in a rotatable state. A spool gear 210 is secured to a spool 211 included in the spool arrangement 22. The gear 210 is pivotally held in a rotatable state and is arranged to be constantly engaging the small gear 209b. A rubber member 211a which is arranged to expedite automatic film winding is applied to the whole circumferential surface of the spool 211. A cover 212 which is arranged to be freely turnable by virtue of a shaft 213 secured to a stationary part of the camera body is disposed in the vicinity of the outside of the spool 211. The cover 212 is pushed by a spring 214 toward the spool 211 and is thus arranged to expedite an automatic film winding operation on the spool 211. While the cover 212, the shaft 213 and the spring 214 are shown in the drawing as arranged in one set, another set of the same arrangement is disposed on the opposite side though it is not shown.

The sprocket 29b is arranged to be driven solely by the film. The rotation of the sprocket 29b is transmitted to a gear 217 by a shaft connecting them. The rotation is further transmitted to a detection gear 218 which engages the gear 217. The gear ratio between the gear 217 and the detection gear 218 is arranged to be 3:4. To the gear 218 is secured a pulse substrate P2 which is arranged to generate one pulse per turn of the gear 218. The pulse is obtained via a contact member S3. The pulse substrate P2 and the contact member S3 jointly form a switch SWFLM3.

With the film winding motor MB controlled by the pulse which is produced while the detection gear 218 makes one turn, one frame portion of film is fed in the case of a full-size 35 mm camera. It goes without saying that, in the case of a half-size 35 mm camera, either the gear ratio between the gear 217 and the detection gear 218 is changed to be 3:2 or the pulse substrate P2 is divided into two equal parts to have one pulse generated every time the gear 218 turns 180 degrees while leaving the gear ratio at 3:4. By this modification, the film feeding extent can be reduced to one half of the film feeding extent of the 35 mm camera. Further, in this instance, the film feeding extent can be changed to the full extent by bringing the film winding motor MB to a stop when two pulses are counted. Further, the camera can be readily switched from the use of film in full frame size over to the use of film in half frame size and vice versa by permitting switch-over between counting one pulse and counting two pulses.

The rotating force of the film winding motor MB is transmitted in the following manner: When the motor MB rotates counterclockwise, each applicable part rotates in the direction of arrow indicated by a full line. The gear 204 rotates clockwise to cause the planetary lever 219a to rotate clockwise. The small gear 205b comes to engage the larger gear 206a. The small gear of the gear 208 comes to engage the large gear 209a. Therefore, the rotation of the winding motor MB is thus transmitted at a great reduction ratio in the following manner: The pinion gear 201→the gear 202 (large and small gears 202a and 202b)→the gear 203 (the large and small gears 203a and 203b)→the gear 204 (the large and small gears 204a and 204b)→the gear 205 (the large and small gears 205a and 205b)→the gear 206 (the large and small gears 206a and 206b)→the gear 207 →the driving sprocket 29a. Meanwhile, the rotation is also transmitted at a great reduction ratio through another channel: The gear 204 (the large and small gears 204a and 204b)→the gear 208 (the large and small gears 208a and 208b)→the gear 209 (the large and small gears 209a and 209b)→the spool gear 210→the spool arrangement 22.

When the motor MB rotates clockwise on the other hand, each applicable part rotates in the direction of arrow indicated by a broken line. The gear 204 rotates counterclockwise to cause the planetary lever 219a to rotate also counterclockwise. This causes the large gear 205a to directly engage the spool gear 210. Therefore, the rotation of the motor is transmitted through a high speed transmission system having a low reduction ratio as follows: The pinion gear 210→the gear 202 (the large and small gears 202a and 202b)→the gear 203 (the large and small gears 203a and 203b)→the gear 204 (the large and small gears 204a and 204b)→the large gear 205a →the spool gear 210. Meanwhile, the transmission to the driving sprocket 29a is blocked and the sprocket 29a becomes freely rotatable.

As described above, the rotation of the film winding motor MB is arranged to be transmitted toward the spool arrangement 22 in one of two different speed reducing ratios according to the rotating direction of the winding motor MB. In short, the counterclockwise rotation of the motor gives a larger speed reducing ratio and the clockwise rotation of the motor a smaller speed reducing ratio. However, the spool arrangement 22 is arranged to rotate always counterclockwise irrespective of the rotating direction of the film winding motor MB.

In the case of automatic film loading, the film winding motor MB is rotated counterclockwise and the rotation transmission is switched over to the winding transmission system of the larger speed reducing ratio to have the driving sprocket 29a and the spool arrangement 22 driven to rotate at a low speed. With the camera automatically loaded with the film in this manner, in feeding one frame portion of film after completion of each photo-taking exposure, the film winding motor MB is rotated clockwise. Then, the rotation transmission is switched over to the other transmission system which is of smaller reducing ratio to have the spool arrangement 22 driven to rotate at a high speed. However, even if the winding motor MB is allowed to rotate counterclockwise instead of clockwise in feeding one frame portion of film, there arises no problem as the driving sprocket 29a is driven by the film being taken up on the spool arrangement 22 with the transmission system set at such a speed reducing ratio that makes the circumferential speed of the spool arrangement 22 higher than that of the driving sprocket 29a. Accordingly, the driving sprocket 29a is arranged to drive the film only in cases where the film is not wound up by the spool arrangement 22. With the exception of such cases, the driving sprocket 29a rotates following the movement of the film irrespective of the rotating direction of the motor MB.

Figure 4:
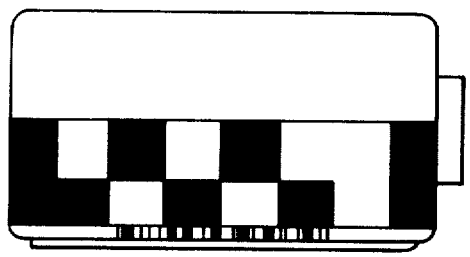
FIG. 4(a) is a side view of a film cartridge which is provided with a DX code.
FIG. 4(b) is an enlarged view of the DX code.
Figure 4:
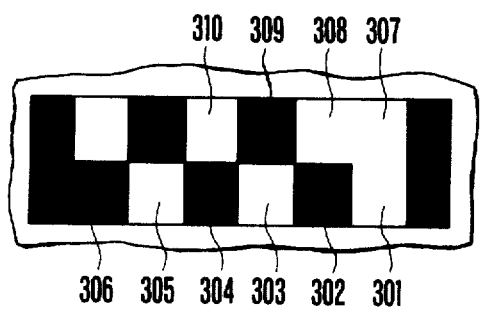

Referring to FIGS. 4(a) and 4(b), the film cartridge of the kind having the DX code is arranged as follows: FIG. 4(a) is a side view of the film cartridge. FIG. 4(b) is an enlarged view of the DX code indicating portion of the film cartridge. The DX code indicating portion includes white parts which are arranged to be electrically conductive and black parts which are arranged to be nonconductive. Meanwhile, although it is not shown, the film cartridge accommodating chamber of the camera body is provided with contact terminals which are located in positions corresponding to the parts 301, 302, 303, 304, 305, 306, 307, 308, 309 and 310 of the DX code indicating portion of the cartridge. These parts of the DX code come into contact with these corresponding contact terminals when the cartridge is placed in the cartridge chamber. The parts 301 and 307 are grounding parts which are arranged to be conductive respectively. The parts 302, 303, 304, 305 and 306 are arranged to indicate the ISO sensitivity value of film. The contact terminals which correspond to these ISO sensitivity indicating parts are connected to the above-stated ISO sensitivity detector DXSV. The detector DXSV is arranged to read out the ISO sensitivity data from the combination of ON and OFF signals coming from these terminals.

Table 1 below shows by way of example ISO sensitivity code arrangement:

TABLE 1

| I.S.O. sensitivity | Indicating parts | | | | |
|---|---|---|---|---|---|
| | 302 | 303 | 304 | 305 | 306 |
| 25 | — | — | — | 305 | — |
| 32 | — | — | — | — | 306 |
| 40 | — | — | — | 305 | 306 |
| 50 | 302 | — | — | 305 | — |
| 64 | 302 | — | — | — | 306 |
| 80 | 302 | — | — | 305 | 306 |
| 100 | — | 303 | — | 305 | — |
| 125 | — | 303 | — | — | 306 |
| 160 | — | 303 | — | 305 | 306 |
| 200 | 302 | 303 | — | 305 | — |
| 250 | 302 | 303 | — | — | 306 |
| 320 | 302 | 303 | — | 305 | 306 |
| 400 | — | — | 304 | 305 | — |
| 500 | — | — | 304 | — | 306 |
| 640 | — | — | 304 | 305 | 306 |
| 800 | 302 | — | 304 | 305 | — |
| 1000 | 302 | — | 304 | — | 306 |
| 1250 | 302 | — | 304 | 305 | 306 |
| 1600 | — | 303 | 304 | 305 | — |
| 2000 | — | 303 | 304 | — | 306 |
| 2500 | — | 303 | 304 | 305 | 306 |
| 3200 | 302 | 303 | 304 | 305 | — |
| 4000 | 302 | 303 | 304 | — | 306 |
| 5000 | 302 | 303 | 304 | 305 | 306 |

In Table 1 above, each part "-" indicates a nonconductive (or black) indicating part shown in FIGS. 4(a) and 4(b). Each of parts showing the same reference numerals as the indicating parts of FIG. 4(b) indicates the conductive (or white) part of FIGS. 4(a) and 4(b). In the case of FIGS. 4(a) and 4(b), an ISO sensitivity value of 100 is shown as the indicating parts 303 and 305 are conductive.

Figure 9:
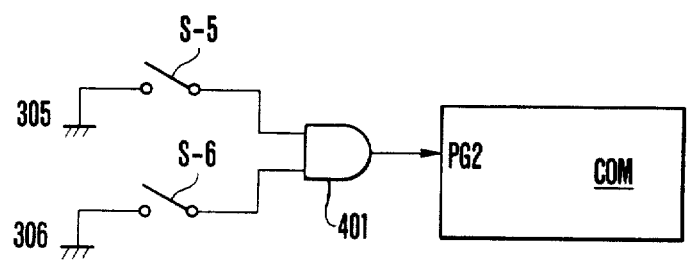
FIG. 9 is a circuit diagram showing in outline a part of an ISO sensitivity detector.

The contact terminals S-5 and S-6 which are arranged to come into contact with the indicating parts 305 and 306 are connected to an AND gate 401 as shown in FIG. 9. Further, in this instance, the parts 305 and 306 are both arranged not to become nonconductive. Meanwhile, a film cartridge that has no DX code is arranged to be nonconductive with the outer circumferential surface thereof covered with some nonconductive coating material. Therefore, in cases where both the signals from the contact terminals corresponding to these parts 305 and 306 are in an OFF state, the ISO sensitivity detector DXSV supplies the microcomputer COM with a NONDX signal on the assumption that the film in use is not provided with the DX code or that the code is misread.

The code parts 308, 309 and 310 indicate the photographable number of frame portions of film. The contact terminals corresponding to these photographable frame number indicating code parts are connected to the above-stated film frame number reading device DXFLM. The photographable number of frame portions is read out from the combination of ON and OFF signals coming from these contact terminals. Table 2 below shows by way of example code arrangement employed in indicating the photographable number of frame portions of film:

TABLE 2

| Number of frames | Indicating code parts | | |
|---|---|---|---|
| | 308 | 309 | 310 |
| 12 | 308 | — | — |
| 20 | — | 309 | — |
| 24 | 308 | 309 | — |
| 36 | — | — | 310 |
| — | 308 | — | 310 |
| — | — | 309 | 310 |
| 72 | 308 | 309 | 310 |

The indicating arrangement of Table 2 is similar to that of Table 1. In the case of FIGS. 4(a) and 4(b), the code is arranged in the form of a black-and-white pattern for the purpose of clearly illustrating the indicating code portion and thus not in conformity to the standardized code arrangement employed in general. However, in this instance, for example, a photographable frame number of 24 is indicated when the code parts 308 and 309 are arranged to be both conductive.

Figure 5:
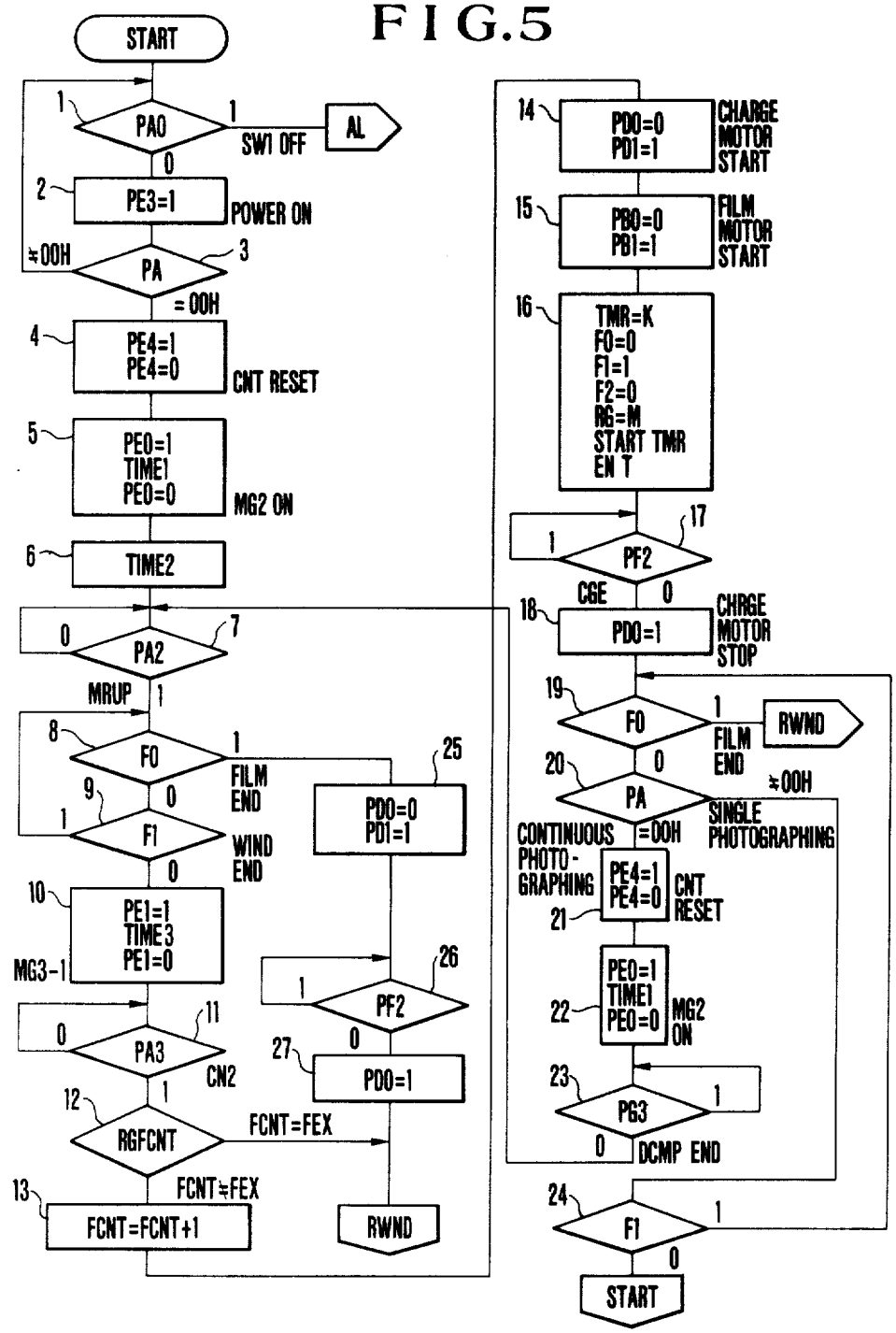
FIGS. 5, 6, 7 and 8 are flow charts.
Figure 7:
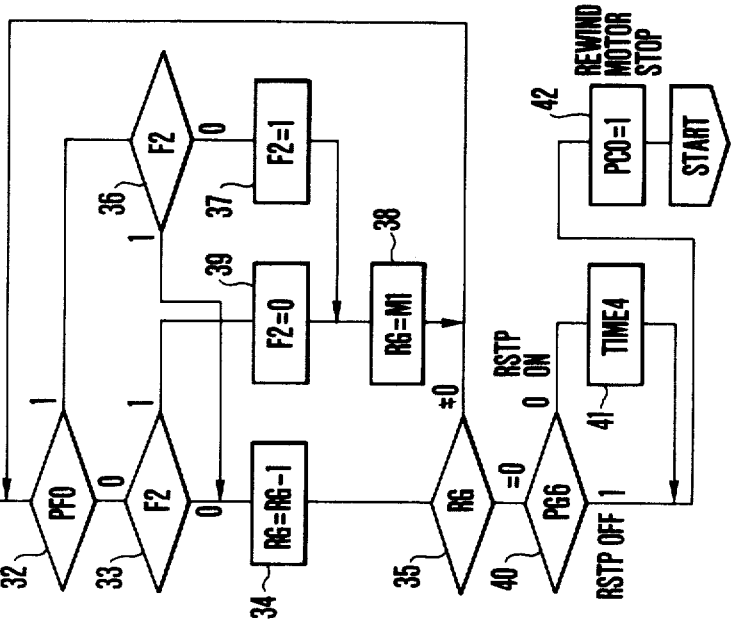
Figure 6:
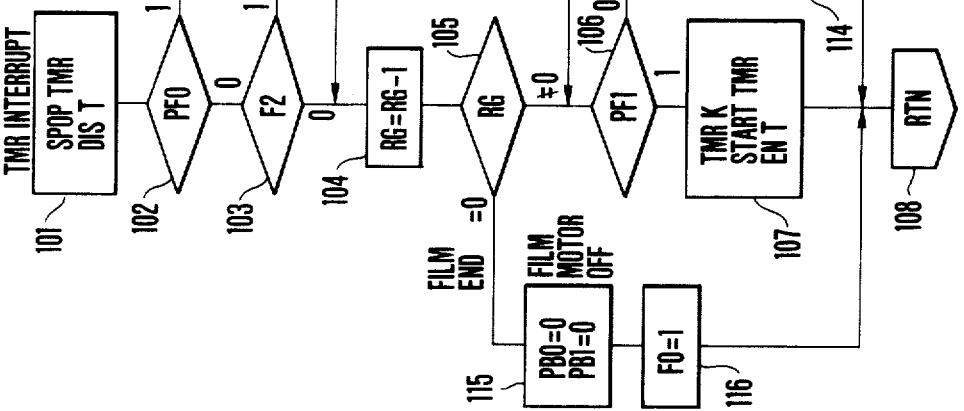

FIGS. 5, 6 and 7 are flow charts showing the operation of the microcomputer COM. The microcomputer COM becomes operative when it receives a power supply voltage VDD with the power supply switch SWVDD turned on. It then receives the fundamental clock pulses from the crystal oscillator QZ. At the same time, a power-on reset action is performed by the capacitor CRST. A program counter which is included in the microcomputer COM is initially set at an address 0. A program beings from a step START. Each flag is set at 0 and each output port is also set at 0.

Step 1: An input is received through the input poart PA0. If the first stroke switch SW1 of the shutter release button is in an ON state, the operation of the microcomputer COM proceeds to a step 2. If the switch SW1 is in an OFF state, the operation comes to an automatic loading routine AL (without photo-taking) which will be described later.

Step 2: The output level of the port PE3 becomes a level 1. This causes the power supply transistor TRBAT to turn on via the inverter I1 and the resistor R10. The voltage Vcc is then supplied to the power supply terminals of all the circuits including the operational amplifier, the AD converter, etc.

Step 3: Inputs (hereinafter referred to as PA input) are received via the input port PA0 to PA3. Then, if the photographer pushes the release button further to the extent of the second stroke thereof with all the applicable parts having been charged, there obtains a condition of PA0=PA1=PA3="0" (the level "0"). Therefore, the PA inputs a value of 00H in the hexadecimal notion. Then, the operation proceeds to a step 4. Further, if any one of the switches connected to the PA ports is in an OFF state, the value of the PA input does not become 00H and the operation comes back to the step 1.

Step 4: The output of the port PE4 is set at a level 1 and is then set at a level 0 to produce one pulse from the port PE4. The counter CNT is reset by the pulse output.

Step 5: The output of the output port PE0 is set at 1 and, after the lapse of a predetermined period of time TIME1, the output is set at 0. The output port PE0 is in connection via the resistor R7 with the transistor TR2. Therefore, a current is allowed to flow to the first clamp magnet MG2 for the predetermined period of time TIME1. A shutter release sequence of processes of the camera is performed. With the first clamp magnet MG thus driven, a known mechanical sequence of processes of the camera beings including an aperture stopping down action, a mirror uplifting action, etc. With the aperture stopping down action thus caused to begin, the brush BR which is arranged to shift its position in response to changes in the aperture comes to travel over the comb-shaped electrode AEFP at the same time as the aperture is stopped down. A signal produced by this is supplied to the counter CNT. Therefore, the counter CNT counts the actually stopped down aperture value in the form of a counted value. The output of the counter CNT is supplied to one of the input terminals of the digital comparator DCMP. Meanwhile, the other input terminal of the digital comparator DCMP which is connected to the output terminal of the AD converter ADC producing the above-stated computed aperture value in a digital value receives the computed value. When the two aperture value inputs come to agree with each other, the output of the digital comparator DCMP becomes a level 0. This signal of the comparator DCMP turns off the transistor TR1 via the resistor R6. With the transistor TR1 thus turned off, a current supply to the aperture control magnet MG1 is cut off to bring the aperture stopping down action to a stop. Aperture control is performed according to the computed aperture in this manner. The output of the digital comparator DCMP is supplied to the input port PG3 of the microcomputer COM.

Step 6: A predetermined wait time TIME2 is obtained by a timer.

Step 7: An input is received via the input port PA2 indicating the state of the mirror. A mirror uplifting action is expected to be performed after the lapse of some period of time because the first clamp magnet MG2 has been actuated. The mirror uplifting action is performed at about the same time as the aperture stopping down action by the operation of the first clamp magnet MG2. While the mirror uplifting action is accomplished approximately in a predetermined period of time, the length of time required for stopping-down the aperture varies with the aperture value. However, a release time which takes place after the pushing operation on the shutter release button and before the shutter is opened must be arranged to be unvarying, because: The photographer is controlling the timing for pushing the release button predictively taking the actual shutter opening time into consideration. If the above-stated release time lag changes, a shutter chance tends to be missed. Such a camera is not reliable. This problem is effectively solved by arranging the wait time TIME2 of the step 6 to be somewhat longer than a maximum time required for stopping down the aperture. With the wait time arranged in this manner, the program of operation shifts to the next step 7 always after completion of the aperture stopping down action. The mirror uplifting time is normally shorter than the maximum aperture stopping-down time. The flow of operation branching out from the step 7 never comes back to the step 7. The operation proceeds to a step 8.

Step 8: A check is made for the state of the flag F0. A state of the flag F0=1 indicates the end of the film.

Step 9: A check is made for the flag F1. A state of the flag F1=0 indicates completion of film winding. At both the steps 8 and 9, the flags F0 and F1 are at a level 0 as a result of the power-on reset process. The flow of operation proceeds to a step 10.

Step 10: The output of the output port PE1 is set at a level 1 and then, after the lapse of a predetermined period of TIME3, it is set at a level 0. The output port PE1 is connected via the resistor R8 to the transistor TR3. Therefore, a current is supplied for a predetermined period of time to the leading shutter curtain magnet MG3-1. This causes the leading shutter curtain to travel. With the leading shutter curtain thus caused to travel, the count switch SWT is opened. Then, the integration circuit which consists of the resistor VR1 and the capacitor C1 comes to operate. The resistor VR1 is mechanically coupled with the resistor VR2. Therefore, a resistance value is selected in accordance with a shutter time setting value. The integrated voltage output of the integration circuit is supplied to one of the input terminals of the comparator CP1. Meanwhile, a voltage which is obtained with the power supply voltage Vcc divided by the resistors R4 and R5 is supplied to the other input terminal of the comparator CP1. Therefore, the output of the comparator CP1 is controlled by the time of a time constant circuit determined by the resistor VR1. After the lapse of the shutter time, the output level of the comparator CP1 becomes a level 1 and is then kept at a level 0 by the one-shot circuit ON1. This causes a current to be supplied to the trailing shutter curtain magnet MG3-2 to allow the trailing shutter curtain to travel.

Step 11: The input terminal PA3 receives an input indicative of the state of the trailing shutter curtain. If the input becomes a level 1 indicating completion of the travel of the trailing shutter curtain, the flow of operation proceeds to a step 12. However, if the travel of the trailing curtain is not completed, the operation remains in the step 11 unit completion of the travel.

Step 12: A check is made to find whether the value FCNT of the photographed frame number register RGFCNT is equal to the photographable number of frame portions of film supplied via the input ports PG0 and PG1. If the photographable frame number FEX and the photographed frame number are found to be equal to each other, the operation comes to a film rewinding step RWND. If not, the operation proceeds to a step 13. In the case of a 36-exposure film, for example, the flow of operation comes to the step RWND upon completion of 36th phototaking exposure and the film is then automatically rewound.

Step 13: An increment of the content of the photographed frame number register RGFCNT is effected by one. As will be further described later on, the photographed frame number register RGFCNT is initially set at 1 during the process of the automatic loading routine AL.

Step 14: The output levels of the output terminals PD0 and PD1 are set at PD0=0 and PD1=1, respectively. By this, the driving circuit DD is actuated to cause the charge motor MD to rotate. With the motor MD thus rotated, the shutter, the mirror and the automatic aperture control device, etc. are charged.

Step 15: The output levels of the output terminals PB0 and PB1 are set at PB0=0 and PB1=1. The driving circuit DC is actuated by this. The film winding motor MB is then rotated clockwise. The film is wound up. The film winding action is performed in parallel with the charging action on the shutter, the mirror, the automatic aperture control device, etc. However, this arrangement may be changed to differentiate the current supply start times for these actions from each other for the purpose of preventing overlapping of rush currents during the initial period of power supply to these motors MD and MB. For example, there may be provided a period of time for waiting until stabilization of the current flowing to the charge motor MD.

Step 16: A constant K is set at a timer interrupting timer TMR. The value of the constant K is determined by a film winding speed, the number of the equal divisions of the pulse substrate P1 (see FIG. 3) of the first film switch SWFLM1 and the time intervals of the instruction giving cycle of the microcomputer COM. The timer interrupting timer TMR is started for making timer interruption possible. A constant M is supplied to the internal register RG. Further flags are set at F0 =F2=0 and F1=1. The flag F2 is arranged to show the ON and OFF states of the first film switch SWFLM1. After the start of the timer TMR, the timer TMR repeats a decrement action independently of the main program routine. Thus, interruption takes place at every predetermined period of time determined by the constant K. Then, the flow of operation jumps from a step at which the program is presently being performed to a separately arranged time interrupting address. The time interrupt operation is as described below with reference to FIG. 6:

Timer Interrupt Operation

Step 101: The decrement action of the timer TRM and the interruption are inhibited.

Step 102: An input from the first film switch SWFLM1 to the input port PF0 is received. The operation proceeds to a step 103 if the input (of the port) PF0 is at a level 0 indicating an ON state of the switch or comes to a step 109 if it is at a level 1 indicating an OFF state of the switch.

Step 103: The flag F2 is checked. With the flag F2 set at 0 at the step 16, the operation proceeds to a step 104.

Step 104: The content of the internal register RG is decreased by 1.

Step 105: A check is made for RG=0. With the program carried on up to this point of operation, the register RG is in a state of $RG=M-1$, wherein M represents a constant. If the constant M is large enough, the content thereof does not become 0 and the operation proceeds to a step 106.

Step 106: The third film switch SWFLM3 which is connected to the sprocket to detect completion of film winding by one frame portion thereof supplies a signal to the input port PF1. With the end of the one frame film winding detected in this step 106, the operation comes to a step 113. If not, it proceeds to a step 107.

Step 107: Again the constant K is set at the timer register. The timer TMR begins to operate to enable interruption.

Step 108: The original program in process is resumed. The timer interrupt operation is provided as it is difficult to make a discrimination between signals coming from the two film switches SWFLM1 and SWFLM3 at intervals of a given period of time during the process of the original or main program. Since each instruction is carried out at a very high speed during the process of the program, there arises no problem with film winding information received at every given time interval determined by the constant K.

Assuming that the first film switch SWFLM1 is turned off by a timer interrupt process, the operation comes from the step 102 to a step 109.

Step 109: A check is made for the flag F2=1. Since the flag F2 has been set at F2=0, the operation proceeds to a step 110.

Step 110: The flag F2 is set at 1. This means that the first film switch SWFLM1 is turned off thus resulting in an input state of PF0=1.

Step 111: Again the constant M is set at the internal register RG. The operation comes to the step 106 to perform the above-stated routine. However, since the flag F2 has been set at F2=1 at the step 110, the ensuing timer interrupt operation comes from the step 109 to the step 104 or comes from the step 103 to a step 112.

Step 112: The flag is set at 0 for the same purpose as in the step 110. Then, the operation comes to the step 111. If one film frame portion winding comes to an end with a current supplied to the film winding motor MB, the third film switch SWFLM3 turns on to bring about an input state of PF1=0. The operation then shifts from the step 106 to a step 113.

Step 113: The port PB0 is set at PB0=1. Since another port PB1 has been set at PB1=1, the power supply to the film winding motor MB is cut off and the brake is applied.

Step 114: The flag F1 is set at F1=0 to indicate completion of film winding. The operation then comes back to the original program at the step 108. Since the step 107 has been skipped in this instance, the timer interruption never again takes place thereafter.

Let us now assume that photographing has been completed on the 24th frame portion of a 24-exposure film which is not provided with any film frame number indicating code. In this instance, the film does not move any further in response to a film winding attempt made by the winding motor MB. Therefore, the first film switch SWFLM1 ceases to make any change-over between its ON and OFF states. Accordingly, the flag F2 remains at 0 or 1. At the step 104, the content of the internal register RG is decreased or subtracted one by one until there obtains a state of RG=0 with the timer interrupt process repeated. The operation then comes to a step 115.

Step 115: The ports PB0 and PB1 are set at PB0=0 and PB1=0 respectively to open both terminals of the winding motor MB.

Step 116: The flag F0 is set at F0=1 to indicate the end of the film. The timer interrupt operation described is constantly carried out between the step 16 of the main routine and the step 9 for a next photographing operation, so that the film winding action of the camera can be accurately controlled.

The main program routine is further performed in the following manner.

Step 17: The microcomputer COM is arranged to receive a signal from the charge switch SWCGE indicating completion of a charging action on the shutter, the automatic aperture control device and the mirror. A routine loop of steps is formed beginning with this step 17 for waiting for completion of the charging action or for turning on of the charge switch SWCGE. If the charging action has not been completed, the operation comes back to the step 17. Upon completion of the charging action, the operation proceeds to a step 18. In the meantime, the timer interrupt operation is repeated between the steps 17 and 18.

Step 18: The output of the port PD0 is set at 1. The brake is applied to the charge motor MD by this.

Step 19: The flag F0 is checked for the end of film. If the film has not been used up, the operation proceeds to a step 20.

Step 20: This step is similar to the step 3. The second stroke switch SW2 remains in an ON state in the case of a continuous photographing. In that case, the input of the input ports PA becomes 00H in the hexadecimal notation. The operation proceeds to a step 21.

Step 21: This step is similar to the step 4. The counter CNT is reset.

Step 22: The step is similar to the step 5. A current is supplied to the first clamp magnet MG2 to allow a next sequence of shutter releasing processes to begin. At that time, film winding may be allowed to be continuously performed. In other words, if it is desired to have photographing continuously performed on a maximum number of frames within a given period of time, the sequence of shutter releasing processes is repeatedly started without waiting for the end of each film winding process.

Step 23: The port PG3 receives a signal indicative of an aperture stopped down state. As mentioned in the foregoing, the aperture stopping action is performed with the first clamp magnet MG2 actuated. The output of the digital comparator DCMP becomes a level 0 upon completion of aperture stopping down control. Therefore, a discrimination can be made between completion and non-completion of the stopping down action from a signal coming via the input port PG3. Upon completion of the aperture stopping down action, the operation comes to the step 7. A noteworthy feature of the embodiment is as follows: For the first round of photographing, the sequence of processes is arranged at the step 6 to make the shutter release time lag unvarying. However, this routine step is skipped for each of ensuing rounds of photographing operation. As mentioned in the foregoing, the length of time required for the mirror uplifting action is shorter than the maximum length of time required for stopping down the aperture. Therefore, the ensuing release time lag can be made shorter than the first time lag. Although the release time lag varies with the controlled aperture value, it is meaningless to make the release time lag unvarying for the second and ensuing rounds of the photographing operation in the event of continuous photographing. In other words, the release time lag depends on the charging time and film winding time during the second and subsequent rounds of photographing and the shutter intervals cannot be determined by the photographer.

With the uplifted state of the mirror having been confirmed in the step 7, a check is made for completion or incompletion of film winding in the step 9. During the period up to this point of time, the timer interruption is applied many times. Upon detection of completion of film winding, the operation proceeds to a next step of shutter control. The routine steps for the continuous photographing operation are performed in this manner. Further, the embodiment is designed to complete film winding before the end of aperture control if the battery is not too old. Therefore, the frame feeding speed can be increased to a maximum extent as the waiting time of the step 9 is eliminated.

Next, the operation in the case of single-frame or non-continuous photographing is carried out as follows: In this instance, the photographer is not pushing the shutter release button to its second stroke position after photographing on one frame. Therefore, the input of the ports PA does not become 00H. The operation, therefore, comes from the step 20 to a step 24.

Step 24: The loop of steps from the step 24 to the step 19 is repeated until the flag F1 is confirmed to be in a state of F1=0 thus indicating an end of film winding through the timer interrupt operation. The flow of operation comes back to the step START after completion of film winding.

In the event that the film comes to the end thereof before completion of the film winding action, the operation is performed in the following manner: The film never comes to its end halfway during the film winding action with the DX code provided on the film cartridge as the number of photographed frames FCNT and the number of photographable frames FEX are compared with each other in the step 12. However, in cases where the film is not provided with the DX code or where a portion of film is cut before it is used for photographing, this accident takes place. In that event, the flag F0 becomes 1 during the process of the timer interrupt operation. Therefore, the flow of operation comes from the step 19 to the rewinding step RWND. The rewinding operation is as shown in FIG. 7. Film Rewinding Operation: Referring to FIG. 7, the flow of operation branches out to a step 30 in cases where a state of FCNT=FEX obtains in the step 12 and where a state of the flag F0=1 obtains at the step 19 respectively.

Step 30: The output ports PC0 and PC1 are set at states of PC0=0 and PC1=1. By this, the driving circuit DC is actuated to cause the rewinding motor MC to rotate.

Step 31: A constant M1 is set at the internal register RG.

Steps 32 to 39: The operation is performed in a manner similar to the program of detecting the movement of film which has been described at the steps 102, 103, 104, 105, 109, 110, 111 and 112 of the timer interrupt operation. In the program of steps 32 to 39, it is detected that the driving sprocket 29a ceases to rotate any further upon completion of film rewinding. The operation proceeds to a step 40 after completion of film rewinding.

Step 40: An input is received via the input port PG6. The operation proceeds to a step 41 if the leader part selection switch SWRSTP which makes selection between a complete film rewinding action winding the film completely into the cartridge and a film rewinding action leaving a leader part of the film outside of the cartridge is in an ON state or comes to a step 42 if this switch SWRSTP is in an OFF state.

Step 41: A predetermined length of waiting time TIME4 is created by means of a timer. In other words, the rewinding motor MC is allowed to continue to rotate after the sprocket 29a comes to a stop, so that the film is completely taken up into the film cartridge in this step.

Step 42: The port PC0 is set at a state of PC0=1. Since the port PC1 has already been set at the state of PC1=1, the power supply to the rewinding motor is cut off and the brake is applied to the rewinding motor MC.

In case that the leader part selection switch SWRSTP is found to be in an OFF state at the step 40, the rotation of the rewinding motor comes to a stop immediately after the stop of rotation of the sprocket 29a. In this case, the film rewinding action comes to an end leaving the leader part of the film on the outside of the film cartridge. With the film rewinding action thus having been completed, the operation comes back to the START step of the main program routine.

Let us next assume that, during the process of continuous photographing, the charging action on the shutter, the mirror and the automatic aperture control device is quickly completed before the end of film winding and that the film winding comes to the end after the first clamp magnet MG2 has been energized at the step 22 for a next round of photographing operation. This condition never arises when the information on the photographable number of frames FEX is received with the DX code provided on the film cartridge. However, in the event of occurrence of the above-stated condition, the film winding comes to a stop in an incompleted state while the aperture is stopped down and the mirror is uplifted as a mechanical release action has been initiated by the first clamp magnet MG2. Since the film cannot be wound up any further, the third film switch SWFLM3 remains in its OFF state. If the film is rewound under this condition, the photographer might perform an erroneous operation by misconceiving the shutter to be open. Further, intense rays of light incident on the lens under such a condition might cause a photographic fog on the film. To avoid such troubles, the film is rewound preferably after bringing the mirror down to its lowered position.

During the period of waiting for completion of film winding at the steps 8 and 9 after confirmation of the uplifted state of the mirror at the step 7, the flag F0 is set at F0=1 at the step 116 of the timer interrupt operation when the end of the film is detected. Then, the flow of operation branches out from the step 8 to the step 25.

Step 25: The ports PD0 and PD1 are set at PD0=0 and PD1=1 to cause the charge motor MD to rotate.

Step 26: A check is made to see if the charging action has been completed. If so, the operation proceed to a step 27.

Step 27: The port PD0 is set at PD0=1 to apply the brake to the charge motor MD. Since the mirror is charged under that condition, the mirror comes back to its original position. Following this, the operation jumps to the step 30 RWND, at which the film rewinding action is performed.

Figure 8:
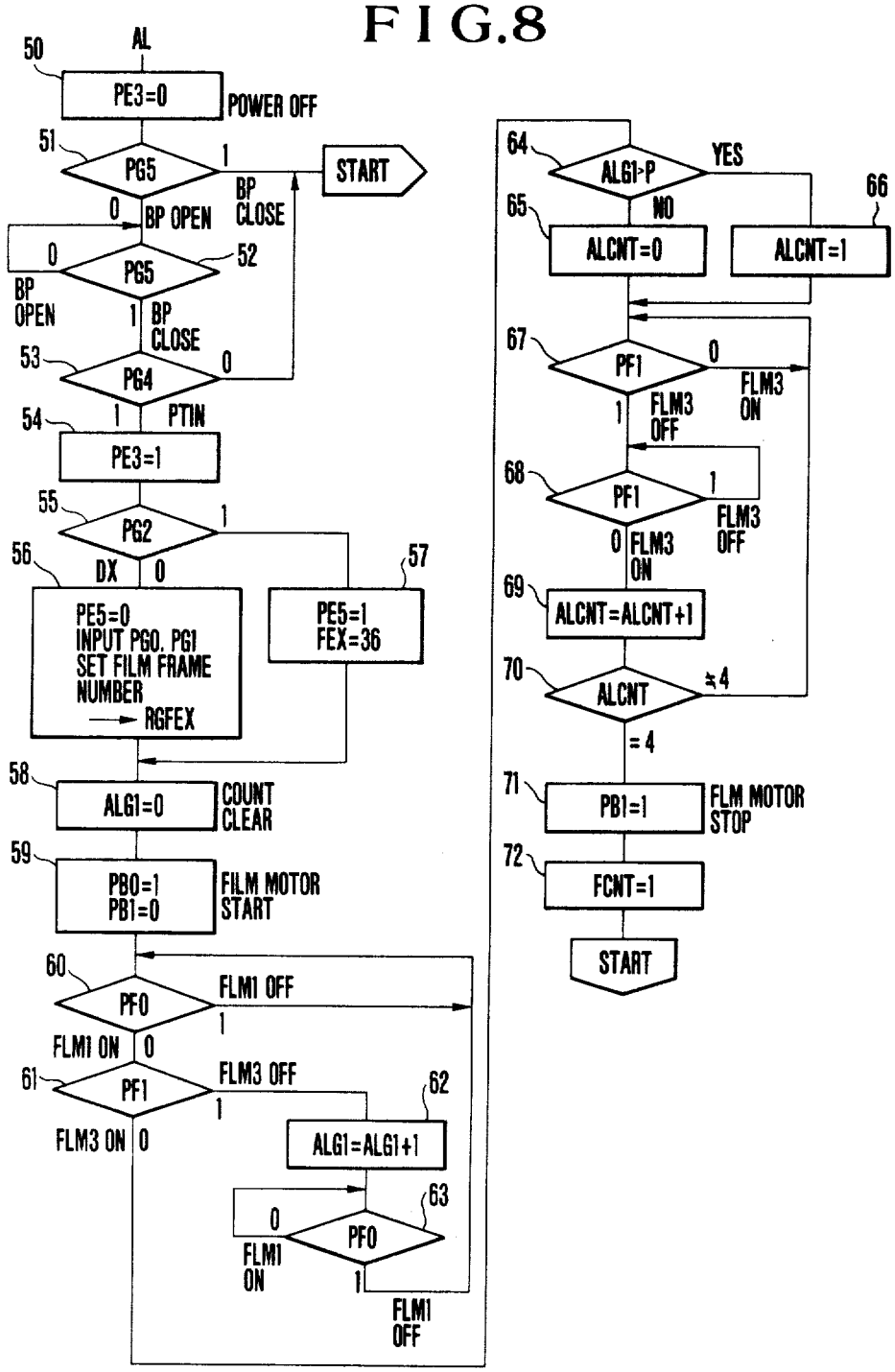

In the last place, let us consider a case where the first stroke switch SW1 of the shutter release button is in an OFF state at the step START of operation. In that case, the operation jumps to an address AL for automatic blank feeding of film. The automatic film blank feeding operation is as shown in FIG. 8.

Automatic Blank Feeding Operation

Step 50: The port PE3 is set at PE3=0. By this the power supply to all the circuit elements is cut off with the exception of the microcomputer COM.

Step 51: A signal from the back lid opening/closing switch SWBP is received via the input terminal PG5. The operation comes back to the step START if the back lid is closed and proceeds to a step 52 if it is open.

Step 52: The signal from the back lid opening/closing switch SWBP is again received via the input terminal PG5. The operation stays at this step 52 until the back lid comes to close. When it closes, the operation proceeds to a step 53. In other words, the camera remains inoperative as long as the back lid thereof is open. Recently, shutters particularly focal plane shutters are made of thin metal blades for a high speed operation. If such a shutter is operated with the back lid in an open state, it might hurt the finger of the photographer. Therefore, the shutter is inhibited from operating when the back lid is not closed. In testing the shutter operation, it can be operated while the back lid is left open with the switch SW1 turned on before opening the back lid.

Step 53: The input port PG4 receives an input from the cartridge presence/absence detection switch SWPT. The operation comes back to the step START when the cartridge accommodating chamber has no cartridge therein and proceeds to a step 54 when it has a cartridge placed therein.

Step 54: The port PE3 is set at PE3=1. The power supply voltage Vcc is supplied to each applicable circuit element.

Step 55: The port PG2 receives an input from the ISO sensitivity detecting means DXSV. In case that the film cartridge is not provided with any DX code, the AND gate 401 sends out an output at a level 1 with both the terminals S-5 and S-6 turned off as mentioned in the foregoing with reference to FIG. 9. In that case, the ISO sensitivity detecting means DXSV (the AND gate 401 of FIG. 9) produces a signal NONDX at a level 1. Further, in the event of a film cartridge provided with some wrong and inappropriate DX code, the detecting means DXSV also produces the signal NONDX. The operation comes to a step 57 in that event and proceeds to a step 56 if this signal NONDX is not produced.

Step 56: The ports PG0 and PG1 receive inputs from the film frame number detector DXFLM. Then, information on the photographable number of frames FEX is stored at the internal FEX register RGFEX. Further, the warning display device LED is not lighted up because the input port PE5 is in a state of PE5=0.

Further, in this instance, among the indicating parts of the DX code shown in FIGS. 4(a) and 4(b), the two-bit information borne by the parts 308 and 309 is alone read out from the corresponding contact terminals. In other words, the code pattern parts 308, 309 and 310 are used for indicating information on the number of available frame portions of film as shown in Table 2. However, the commercially available film products in general are limited to film products prepared for 12, 24 and 36 exposures. Therefore, the number of frame portions of film is detectable from the information borne only by the parts 308 and 309 among other parts of the code pattern. In accordance with this invention, therefore, the detector DXFLM is arranged to obtain the signals of the contact terminals corresponding to the above-stated parts 308 and 309. The signal thus obtained is supplied to the input ports PG0 and PG1 of the microcomputer COM.

Step 57: The port PE5 is set at PE5=1 to cause thereby the warning display device LED to light up. Further, the internal FEX register RGFEX is set at 36 to inhibit the use of film in excess of 36 photo-taking exposures in the case of a film product having no DX code.

Step 58: An internal count register ALG1 which is arranged to count the number of repeating times of the ON and OFF action of the first film switch SWFLM1 for automatic loading is set in its initial position 0.

Step 59: The ports PB0 and PB1 are set at PB0=1 and PB1=0 to cause the film winding motor MB to rotate in the direction reverse to the normal feeding direction. The motor MB thus rotates the sprocket 29a to cause the film to come into the spool.

Step 60: The input port PF0 receives an input from the first film switch SWFLM1. The operation waits until the first film switch SWFLM1 turns on and then proceeds to a step 61.

Step 61: The port PF1 receives an input from the third film switch SWFLM3. If the third film switch SWFLM3 is in an OFF state, the operation proceeds to a step 62.

Step 62: The content of the internal count register ALG1 is increased by one.

Step 63: The port PF0 again receives an input from the first film switch SWFLM1. The first film switch SWFLM1 has been in an ON state since the step 60. Therefore, in this step, the flow of operation waits until the switch SWFLM1 turns off and then comes back to the step 60. The loop of steps 60, 61, 62 and 63 is repeatedly performed. When the third film switch SWFLM3 comes to turn on for the first time, the operation proceeds to a step 64. Further, one frame portion of the film is fed when the third film switch SWFLM3 turns on. This one frame feeding action is accomplished by causing the motor MB to rotate and, after that, by having the internal count register ALG1 count the number of repeating times of the ON and OFF action of the first film switch SWFLM1 repeated before the third film switch SWFLM3 first comes to turn on.

Step 64: The content of the internal count register ALG1 is compared with a constant P. The constant P is set at a value not exceeding a number of pulses obtained from the pulse substrate P1 via the contact member S1 for one frame portion of film. Therefore, in case that the content of the internal count register ALG1 exceeds the constant P, it indicates that the portion of film taken up into the spool is long. If the former is smaller than the constant P, it indicates a shorter portion of film is taken up into the spool. The operation comes to a step 66 in the case of ALG1>P and proceeds to a step 65 in the event of ALG1<P.

Step 65: An automatic loading frame number counting internal register ALCNT (hereinafter referred to as the frame number register) is set at ALCNT=0.

Step 66: The frame number register is set at ALCNT=1.

Step 67: The port PF1 receives an input from the third film switch SWFLM3. The third film switch SWFLM3 has been in an ON state since the step 61, the operation waits until the switch SWFLM3 turns off. With the switch SWFLM3 turned off, the operation proceeds to a step 68.

Step 68: The port PF1 receives an input from the third film switch SWFLM3, which has been in an OFF state since the step 67. The operation waits until the third film switch SWFLM3 turns on. With the switch turned on, the operation proceeds to a step 69. Accordingly, one frame portion of film has been fed when the operation comes to the step 69.

Step 69: The content of the frame number register ALCNT is increased by one.

Step 70: The frame number register ALCNT is checked for a state of ALCNT=4. This is because the number of frame portions of film to be fed in a blank state (without photographing) is four in general. Since, up to that time, the content of the frame number register is only 1 or 2, the operation comes back to the step 67 to repeat the above-stated routine until there obtains a state of ALCNT=4. When this state obtains, the operation proceeds to a step 71. The steps 64 to 70 are arranged such: Three frame portions of film are blank fed after the start of automatic loading and before the third film switch SWFLM3 comes to turn on for the first time when the length of the film taken up on the spool is long while four frame portions of film are blank fed if the length of film taken up on the spool during that period is short. By virtue of this arrangement, the length of film to be taken up on the spool by automatic loading does not much vary without fixedly setting the phase of the third film switch SWFLM3.

Step 71: The port PB1 is set at PB1=1. The other port PB0 has been set at PB0=1 at the step 59. Therefore, at the step 71 a current supply to the film winding motor MB is cut off and a brake is applied to the motor.

Step 72: The photographed number of frames FCNT is set at FCNT=1. With this, the film blank feeding action comes to an end. The operation then comes back to the step START of the main program routine.

Figure 10:
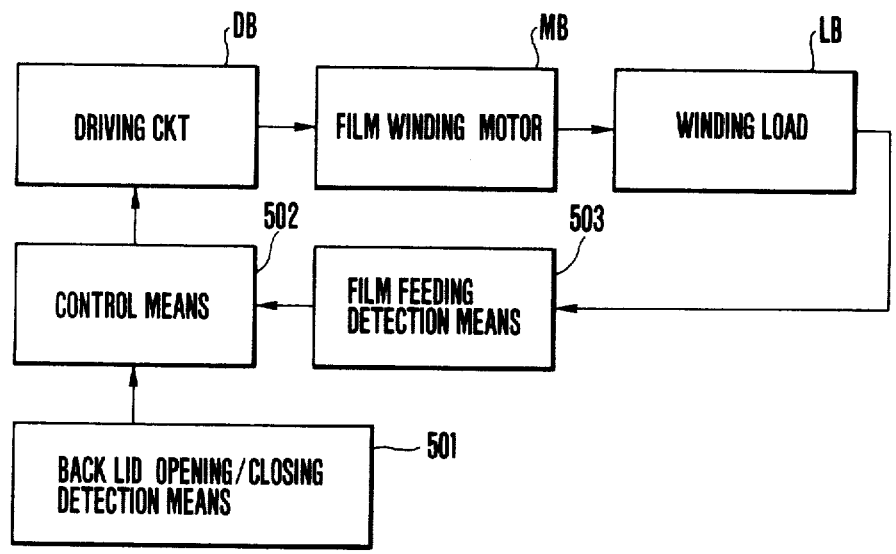
FIG. 10 is a block diagram showing one aspect of this invention.
Figure 11:
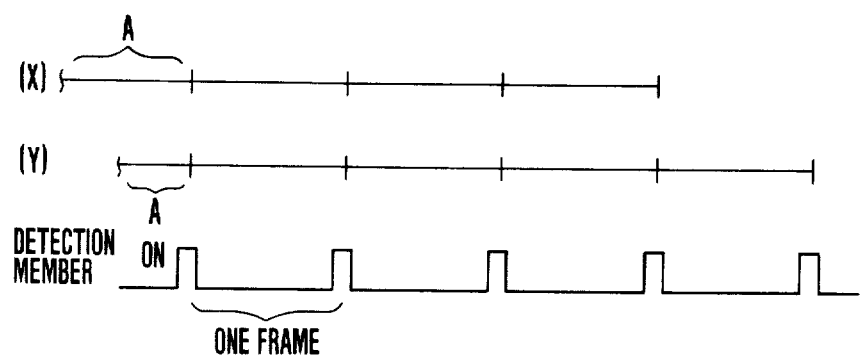
FIG. 11 is a timing chart showing an automatic loading operation.

FIG. 10 shows in a block diagram one aspect of the invention. Back lid opening/closing detection means 501 is arranged to detect the open and closed states of the black lid of the camera. When the back lid is closed after film loading, control means 502 which includes a microcomputer, for example, is informed of closing of the back lid. A motor MB which is arranged solely to perform film winding is driven by a driving circuit DB. Then, the leader part of the film is automatically taken up on a spool in a known manner. A film feeding detection means 503 is arranged to always detect the film feeding state of the camera. To being with, the detection means 503 detects a film length fed before feeding a first blank frame portion of the film. Referring to FIG. 11, if the feeding film length A is long, the predetermined number of frame portions to be blank fed before a first photographing frame portion is decreased by one as shown at a part (X) in FIG. 11. In the event of a short feeding film length A, the predetermined number of frame portions of film are blank fed as shown in another part (Y) of FIG. 11.

What is claimed is:

1. A camera having an automatic loading device which includes a first film winding detection means for generating a one-frame detection signal by detecting a film winding time interval for every frame portion of the film and is arranged to continuously blank feed a plurality of frame portions of the film on the basis of said one-frame detection signal when the camera is loaded with said film, comprising:
    (a) second film winding detection means arranged to detect a film winding extent shorter than one frame and to generate a plurality of film movement detection signals every time one frame portion of said film is wound up;
    (b) third film winding detection means for detecting from the number of said film movement detection signals of said second detection means the amount of film blank fed during a period of time between the start of blank film feeding and generation of the one-frame detection signal by said first film winding detection means; and
    (c) control means for variably controlling the number of blank fed frame portions of said film on the basis of the result of detection made by said third film winding detection means.

2. A camera according to claim 1, wherein said first film winding detection means includes a rotation detecting wheel which is arranged to rotate following the movement of said film when said film is wound up.

3. A camera according to claim 1, wherein said second film winding detection means includes a rotation detecting wheel which is arranged to rotate following the movement of said film when said film is wound up.

4. A camera according to claim 1, wherein said control means is arranged to set said number of blank fed frame portions of film at n (n: a positive integer exceeding (2) when the number of said film movement detection signals generated during the period of time between the start of said blank film feeding and the generation of said one frame detection signal is detected to be larger than a predetermined number by said third film winding means and to set said number of blank fed frame portions of film at n+1 when the number of said film movement detection signals generated is detected to be smaller than said predetermined number by said third film winding detection means.

5. A camera according to claim 4, wherein said third film winding detection means is arranged to detect the number of said film movement detection signals generated during a period of time between commencement of said blank film feeding and the generation of said one-frame detection signal for the first time.

6. A camera having an automatic loading device which includes a first film winding detection means arranged to have a rotation detecting wheel for detecting a film winding interval for every one-frame portion of film and to generate a one-frame detection signal every time said rotation detecting wheel comes to a specific rotating position, said automatic loading device being arranged to continuously blank feed a plurality of frame portions of said film on the basis of said one-frame detection signal, when said camera is loaded with said film, comprising:

(a) position detecting means arranged to detect an angular rotation position in which said rotation detecting wheel of said first film winding detection means has been located at the start of said blank film feeding; and (b) control means for variably controlling the number of blank fed frame portions of said film on the basis of the result of detection made by said position detecting means.

* * * * *

UNITED STATES PATENT AND TRADEMARK OFFICE
CERTIFICATE OF CORRECTION

PATENT NO. : 4,716,428

DATED : December 29, 1987

INVENTOR(S) : Masaharu Kawamura et al.

It is certified that error appears in the above-identified patent and that said Letters Patent is hereby corrected as shown below: Title page:

Item 30. Insert priority date as follows:
-- Dec. 20, 1985 [JP] Japan.......60-287168 --

Signed and Sealed this

Twenty-eighth Day of June, 1988

Attest:

DONALD J. QUIGG

Attesting Officer

Commissioner of Patents and Trademarks